United States Patent [19]
Raynor

[11] Patent Number: 4,607,706
[45] Date of Patent: Aug. 26, 1986

[54] SECTIONAL DISC ASSEMBLY FOR GROUND-WORKING IMPLEMENTS

[76] Inventor: Ian Raynor, Bay 5, 1249 Clarence Avenue, Winnipeg, Manitoba, Canada, R3T 1T4

[21] Appl. No.: 623,346
[22] Filed: Jun. 22, 1984
[51] Int. Cl.⁴ .............................................. A01B 23/06
[52] U.S. Cl. .................................... 172/599; 172/604; 172/535
[58] Field of Search ............... 172/535, 599, 556, 557, 172/604, 555, 601, 604, 568

[56] References Cited

U.S. PATENT DOCUMENTS

| | | | |
|---|---|---|---|
| 126,655 | 5/1872 | Tuttle | 172/604 |
| 789,275 | 5/1905 | Harris | 172/556 |
| 1,954,783 | 4/1934 | Bohmker | 172/599 |
| 2,271,354 | 1/1942 | Strandlund | 172/535 |
| 2,331,738 | 10/1943 | Seaholm | 172/599 X |
| 2,468,278 | 4/1949 | Thomas | 172/599 X |
| 2,603,049 | 7/1952 | Mallin | 172/599 |
| 4,016,935 | 4/1977 | Miller | 172/604 |
| 4,420,048 | 12/1983 | Peterson | 172/599 |

FOREIGN PATENT DOCUMENTS 859317 1/1958 United Kingdom ................ 172/599

Primary Examiner—Richard J. Johnson
Attorney, Agent, or Firm—Stanley G. Ade

[57] ABSTRACT

End-to-end disc spools are mounted on a shaft and each spool includes an annular recess around one end thereof into which disc segments are engaged by the inner ends thereof nesting into said recess and being held by recessed bolts. Lugs on the other end of each spool engage recesses on the one end of the next adjacent spool for centralizing same and ensuring mutual rotation. In one embodiment, spaced apart spools include bearing carriers for mounting the assembly for rotation within the implement.

26 Claims, 6 Drawing Figures

SECTIONAL DISC ASSEMBLY FOR GROUND-WORKING IMPLEMENTS

BACKGROUND OF THE INVENTION

This invention relates to new and useful improvements in sectional disc assemblies for ground-working implements such as one-way discers, discer seeders, tandem discers and the like.

Conventionally, a plurality of concave-convex discs are mounted in spaced and parallel relationship upon a shaft which in turn is mounted within the implement so that they can be raised and lowered to engage the ground at an angle to plow the land or open or close furrows and the like. It will be appreciated that such discs suffer heavily from wear particularly when used in sandy or gravelly soil so that sharpening and/or replacement is somewhat difficult.

Attempts have been made in the past to provide segmented discs of one form or another and examples known to applicant include U.S. Pat. No. 2,603,049 which teaches a plurality of outer rim segments bolted to a central hub with both the bolt heads and nuts being exposed to the wear characteristics of the ground within which they operate.

U.S. Pat. No. 1,797,824 shows a somewhat similar arrangement mounted on spokes which suffers from similar faults.

U.S. Pat. Nos. 744,597 and 2,754,744 both show a plurality of knife blades for mould board plow blades bolted to a central hub which, in the former case requires complete disassembly in order to replace same and in the second instance utilizes sideways curved blades which require a plurality of nut and bolt assemblies to hold each segment.

Perhaps the closest art known to applicant is U.S. Pat. No. 2,271,354 which utilizes a plurality of segments bolted to the periphery of a central plate hub and once again the nut and bolt assemblies are fully exposed to the soil being worked.

SUMMARY OF THE INVENTION

The present invention overcomes disadvantages inherent in the prior art by utilizing a sectional disc spool to which the segments may be bolted with the inner ends stabilized by a recess into which they are seated.

The segments are mounted upon a shaft and are locked one to the other to centralize same and to prevent independent rotation of one relative to the other.

In accordance with one aspect of the invention, there is provided a disc assembly for ground-working implements comprising in combination a main mounting shaft and a plurality of sectional disc holding spools mounted on said shaft in end-to-end relationship, each spool including a disc segment holding end and an adjacent spool mating end, said disc segment holding end including an annular stabilizing recess concentrically located upon said disc segment holding end and spaced inwardly from the outer edge thereof, at least two disc segments engagable by the inner ends thereof into said stabilizing recess and means to clamp said segments to said disc segment holding end, outboard of said recess.

In accordance with a further aspect of the invention, there is provided a disc assembly for ground-working implements comprising and in combination a main mounting shaft and a plurality of sectional discs spools mounted upon said shaft in end-to-end relationship, each disc spool including a concave one end and an annular stabilizer recess formed concentrically upon said one end spaced inwardly from the outer edge thereof, a plurality of disc segments engagable by the inner ends thereof, within said recess and means clamping said segments to said one end, outboard of said recess.

In accordance with still another aspect of the invention, there is provided a spool for holding disc segments on a ground-working implement, said spool including a disc segment holding end and an adjacent spool mating end, said disc segment holding end including an annular stabilizing recess concentrically located upon said disc segment holding end spaced inwardly from the outer edge thereof, at least two disc segments engagable by the inner ends thereof, in two said stabilizing recess and means to clamp said segment to said disc segment holding end outboard of said recess.

A further advantage of the invention is that the disc spools can readily be adapted for use as bearing carriers at any desired location along the length of the assembly thus facilitating the mounting of the disc assembly within the ground-working implement.

Another advantage of the invention is that individual segments can readily be unbolted and disengaged from the spool and sharpened and/or replaced as desired.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 4 is a front elevation of FIG. 2.

In the drawings like characters of reference indicate corresponding parts in the different figures.

DETAILED DESCRIPTION

Figure 1:
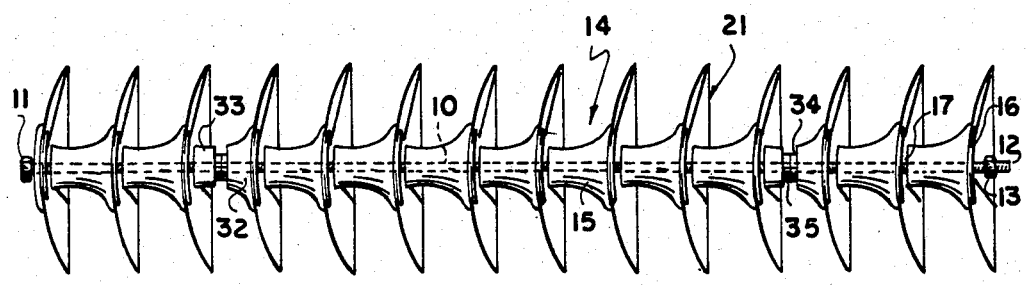
FIG. 1 is a partly schematic side elevation of the preferred embodiment of the disc assembly.

Proceeding therefore to describe the invention in detail, reference should first be made to FIG. 1 which shows a central mounting shaft 10 which, in this embodiment, includes a bolt head 11 on one end and a screw threaded end 12 at the other on to which a screw threaded nut 13 may be engaged.

This shaft extends through a plurality of sectional disc spools collectively designated 14 which are threaded on to the shaft in contiguous relationship one with the other whereupon the nut is tightened thus clamping the entire assembly together as one unit.

Figure 2:
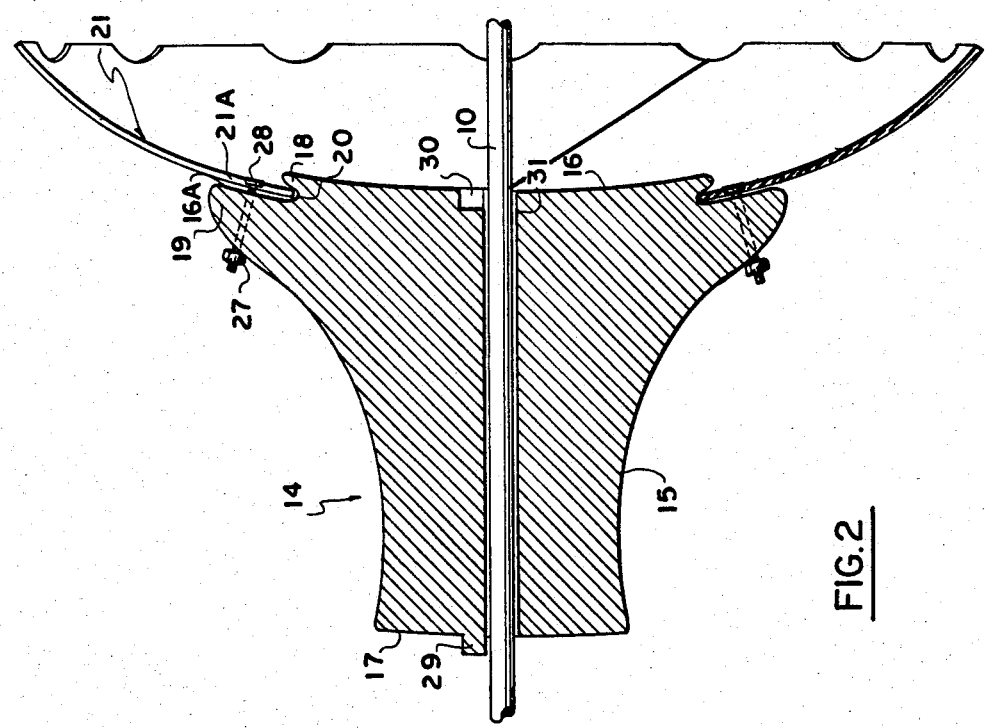
FIG. 2 is an enlarged side elevation of one of the sectional disc spools of the preferred embodiment.

Each sectional disc spool collectively designated 14 consists, in the preferred embodiment of FIG. 2, of a substantially cylindrical body 15 having a disc segment holding end 16 and an adjacent spool mating end 17. In this embodiment, the end 16 is substantially concave and the end 17 is convex and it will be noted that the diameter of end 16 is considerably larger than the end 17. This enlarged concave end 16 provides room for an annular flange 18 concentrically formed on the concave surface 16 spaced inwardly from the outer perimeter 19 and extending radially outwardly with respect to the longitudinal axis of the spool 14 thus defining an inwardly extending annular recess 20 as clearly shown in FIG. 2.

Disc segments collectively designated 21 are provided and although three equilateral disc segments are shown, nevertheless it will be appreciated that any desired number may be provided depending upon design parameters. Each disc segment includes an inner concavedly curved end 22, radially extending side ends 23 and a curved outer edge 24 which may be edge sharpened in the usual way and may be finished as desired, for example, with concave recesses 25.

Each segment engages within the recess, by the inner edge 22 thereof and extends radially outwardly as clearly shown and is clamped in position by a nut and bolt assembly 26 each of which passes through apertures within the disc segment outboard of the recess 20 and through the outboard portion of the end 16 of the disc spool to be secured by means of nut 27, it being understood that the head 28 of the bolt is countersunk within the thickness of the disc segment 21.

The disc segments are situated all around the recess in contiguous relationship one with the other to form a complete disc when assembled.

It will be observed that the contour of the portion 21A of the disc segments engaging the surface 16A of the concave end 16 are complimentary one with the other so that the curvature of the disc segment is an extension of the curvature of the concave end 16.

Figure 3:
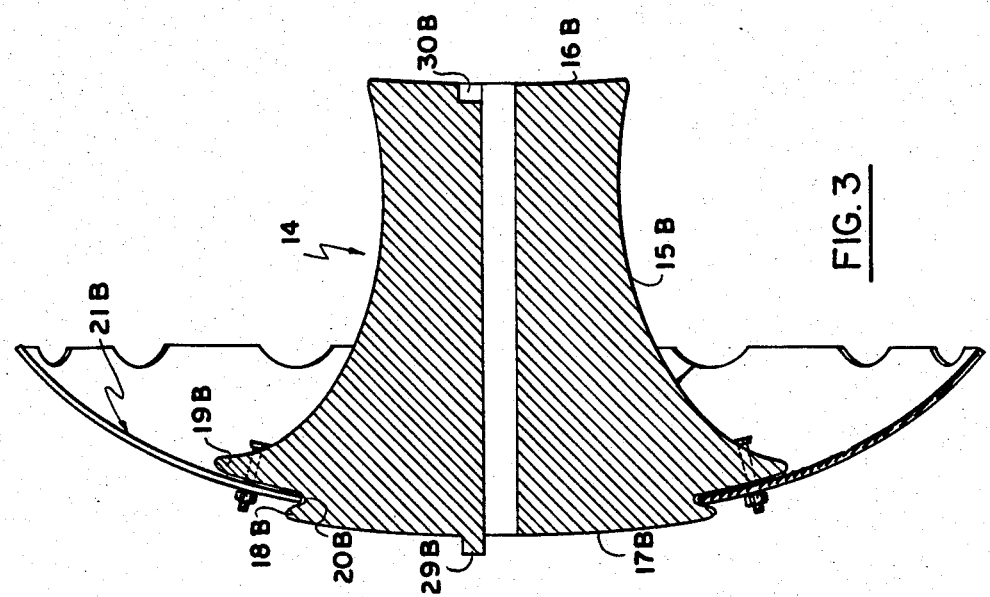
FIG. 3 is a view similar to FIG. 2 but showing an alternative embodiment.

FIG. 3 shows an alternative construction in which the enlarged end 17A is convexedly curved and the smaller end 16A is concavedly curved. In this embodiment, the end 17B acts as the disc segment holding end and the end 16B acts as the adjacent spool mating end with the disc segments bolted to the outer face of the end 17B and nesting in a similarly formed recess.

Similar numbers have been given to common parts but with the suffix "B" added thereto for clarity.

The spool 14 is longitudinally bored so that it engages upon the central shaft 10 and adjacent disc spools are locked together by the provision of a centralizing lug 29 extending from the end 17 and a corresponding recess 30 formed on the end 16 both adjacent the central bore 31 through the sectional disc spool. This means that the lug 29 of one spool can engage within the recess 30 of the next adjacent spool which assists in centralizing the disc spools and disc segments secured thereto as well as ensuring that they all rotate concurrently one with the other when in use.

Figure 5:
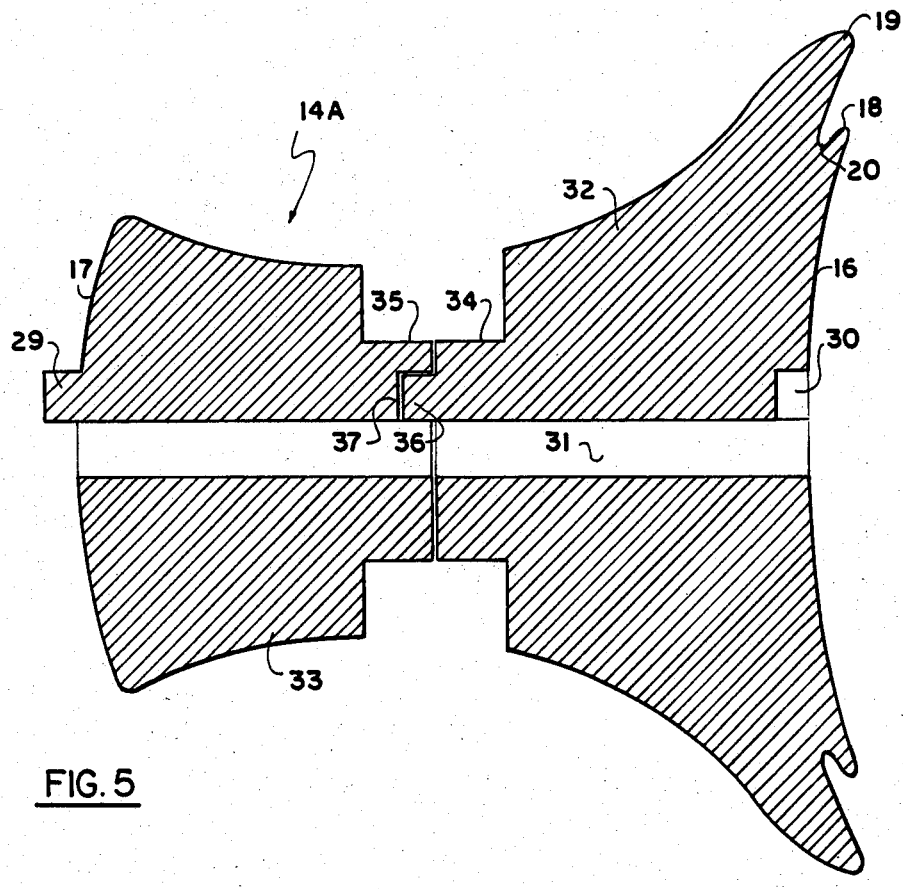
FIG. 5 is a side elevation of one of the bearing carrier spools.

FIGS. 1 and 5 show bearing carrier spools collectively and specifically designated 14A. These are provided at spaced intervals along the shaft 10 as shown in FIG. 1 and act as bearing carrier spools. Each bearing carrier spool 14A consists of a disc segment holding end portion 32 and an adjacent spool engaging portion 33. The outer ends of these portions are similar to the outer ends of the sectional discs 14 so that corresponding numbers have been given to the corresponding parts.

However the inner ends of these portions are each provided with a bearing surface portion 34 and 35 respectively, the diameter of which is less than the diameter of the sectional discs 14, at this location thus forming a turned surface for bearings when the two portions are in end-to-end engagement with one another as clearly shown in FIG. 5. In this connection, a centralized lug 36 is shown on portion 32 and a corresponding recess 37, on portion 33 thus locking the two together when assembled.

These bearing carrier spools allow the assembly to be mounted within a ground-working implement in a manner similar to the conventional disc assembly and of course the bearing carrier spools can be located as desired along the length of the assembly depending upon design parameters of the ground-working implement.

It will therefore be seen that the individual disc segments are easily replaced and/or repaired as necessary without the necessity of having to disassembly the entire disc assembly and that in any event assembly and disassembly is readily undertaken if necessary.

Figure 3A:
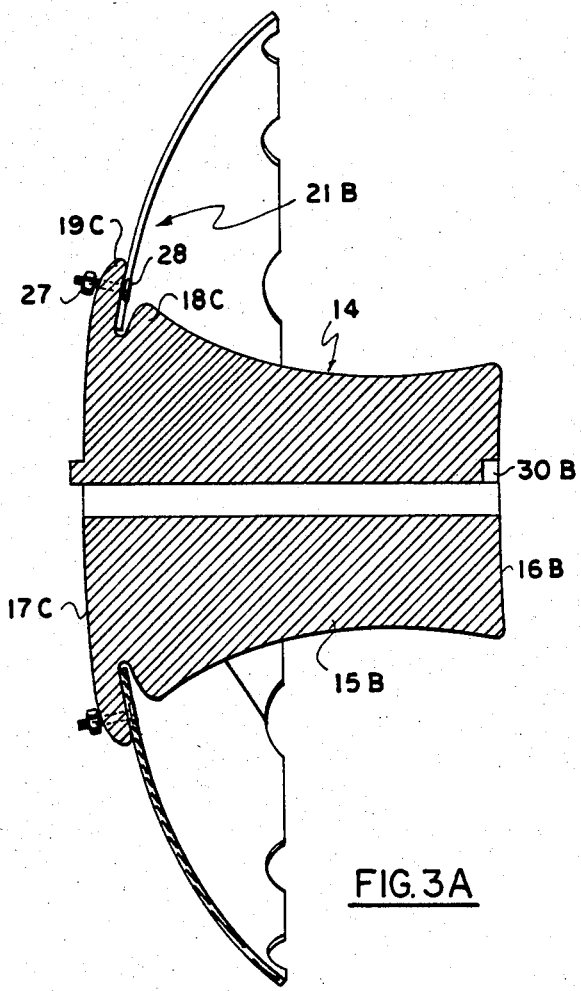
FIG. 3A is a view similar to FIG. 3 but showing an alternative construction.

FIG. 3A shows a variation of FIG. 3 in that the perimeter 19C of the outer end 17C, extends beyond the flange 18C which is thus inboard of the outer end or on the inner face thereof and receives the segments 21 which are secured by nuts and bolts 27 and 28. This provides more support for the segments when in use and is the preferred construction of this embodiment.

In all cases it will of course be appreciated that the plurality of spools 14 may be cast or otherwise formed in multiples of spools or as a one piece construction. However this is not illustrated as it is believed to be clearly understood from the description and the drawings attached hereto.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A disc assembly for ground-working implements comprising in combination, a main mounting shaft and a plurality of sectional disc holding spools mounted on said shaft in end-to-end relationship, each spool including a disc segment holding end and an adjacent spool mating end, said disc segment holding end including an integral annular flange extending radially outwardly from said disc segment holding end towards the outer perimeter of said spool thereby defining an annular stabilizing recess concentrically located solely upon said disc segment holding end and spaced inwardly from the outer edge thereof, at least two disc segments engagable by the inner ends thereof into said stabilizing recess and means outboard of said recess to clamp said segments to said disc segment holding end.

2. The disc assembly according to claim 1 in which said segments extend all around said recess in substantially contiguous relationship one with the other.

3. The assembly according to claim 1 in which the contour of said disc segment holding end, at least outboard of said recess, is complimentary to the contour of the face of the engaging portion of said disc segments.

4. The assembly according to claim 3 in which said contour is concave.

5. The assembly according to claim 3 in which said contour is convex.

6. The assembly according to claim 1 in which said means clamping said disc segments to said spool include at least one bolt fastening means extending through said one end outboard of said recess, the head of said bolt being recessed within the outer surface of said segment.

7. The assembly according to claim 1 which includes means on one end of each spool engagable with mating means on the other end of next adjacent spool for centralizing same and preventing independent rotation of one relative to the other.

8. The assembly according to claim 7 in which selected ones of said spools include means for receiving bearings for journalling said assembly for rotation within said earth-working implement.

9. The assembly according to claim 8 in which said means comprises said spool including two portions, a disc segment holding end portion and an adjacent spool mounting end portion, said two portions including an inner bearing receiving end portion, said two inner bearing receiving end portions including means to lock same together on said shaft in contiguous relationship thus forming said means for receiving said bearing.

10. The assembly according to claim 1 in which selected ones of said spools include means for receiving bearings for journalling said assembly for rotation within said earth-working implement.

11. The assembly according to claim 10 in which said means comprises said spool including two portions, a disc segment holding end portion and an adjacent spool mounting end portion, said two portions including an inner bearing receiving end portion, said two inner bearing receiving end portions including means to lock same together on said shaft in contiguous relationship thus forming said means for receiving said bearing.

12. A disc assembly for ground-working implements comprising in combination a main mounting shaft and a plurality of sectional disc holding spools mounted upon said shaft in end-to-end relationship, each disc spool including a concave one end and an integral annular flange extending radially outwardly from said disc segment holding end towards the outer perimeter of said spool thereby defining an annular stabilizing recess formed concentrically solely upon said one end spaced inwardly from the outer edge thereof, a plurality of disc segments engagable by the inner ends thereof, within said recess and means outboard of said recess clamping said segments to said one end.

13. The assembly according to claim 12 in which said segments extend all around said recess in substantially contiguous relationship one with the other, to form a concave-convex earth working disc.

14. The assembly according to claim 12 which includes means on one end of each spool engagable with mating means on the other end of next adjacent spool for centralizing same and preventing independent rotation of one relative to the other.

15. A spool for holding disc segments on a ground-working implement, said spool including a disc segment holding end and an adjacent spool mating end, said disc segment holding end including an integral annular flange extending radially outwardly from said disc segment holding end towards the outer perimeter of said spool thereby defining an annular stabilizing recess concentrically located solely upon said disc segment holding end spaced inwardly from the outer edge thereof, at least two disc segments engagable by the inner ends thereof, into said stabilizing recess and means outboard of said recess to clamp said segments to said disc segment holding end.

16. The spool according to claim 15 in which said segments extend all around said recess in substantially contiguous relationship one with the other.

17. The spool according to claim 15 in which the contour of said disc segment holding end, at least outboard of said recess, is complimentary to the contour of the face of the engaging portion of said disc segments.

18. The spool according to claim 17 in which said contour is concave.

19. The spool according to claim 17 in which said contour is convex.

20. A spool for holding disc segments on a ground-working implement, said spool including a disc segement holding concave one end and an integral annular flange extending radially outwardly from said disc segment holding end towards the outer perimeter of said spool thereby defining an annular stabilizing recess formed concentrically solely upon said one end spaced inwardly from the outer edge thereof, a plurality of disc segments engagable by the inner ends thereof within said recess and means outboard of said recess clamping said segments to said one end.

21. The spool according to claim 20 in which said segments extend all around said recess in substantially contiguous relationship one with the other.

22. The spool according to claim 20 in which the contour of said disc segment holding end, at least outboard of said recess, is complimentary to the contour of the face of the engaging portion of said disc segments.

23. The spool according to claim 22 in which said contour is concave.

24. The spool according to claim 22 in which said contour is convex.

25. The spool according to claim 20 in which said annular stabilizing recess is situated on the outer face of said one end.

26. The spool according to claim 20 in which said annular stabilizing recess is situated on the inner face of said one end.

* * * * *